United States Patent [19]

Havriliak

[11] 3,912,773

[45] Oct. 14, 1975

[54] CASTING RESIN SYSTEM CONTAINING ACRYLIC POLYMER IN ACRYLIC MONOMER, DIEPOXIDE, AND POLYETHYLENICALLY UNSATURATED MONOMER

[75] Inventor: Stephen Havriliak, Huntington Valley, Pa.

[73] Assignee: Rohm & Haas Company, Philadelphia, Pa.

[22] Filed: July 22, 1974

[21] Appl. No.: 490,457

[52] U.S. Cl. ...... 260/42.28; 260/37 EP; 260/45.7 P; 260/836; 260/837
[51] Int. Cl.² ..................... C08K 5/15; C08L 63/00
[58] Field of Search ..... 260/836, 837, 37 EP, 42.28; 312/228

[56] References Cited
UNITED STATES PATENTS

| | | | |
|---|---|---|---|
| 3,378,601 | 4/1968 | Tanaka | 260/836 |
| 3,506,736 | 4/1970 | Najvar | 260/837 |
| 3,535,403 | 10/1970 | Holib | 260/837 |
| 3,631,127 | 12/1971 | Nomura | 260/837 |
| 3,674,893 | 7/1972 | Nowak | 260/837 |
| 3,697,619 | 10/1972 | Nagata | 260/837 |
| 3,772,062 | 11/1973 | Shur | 260/837 |
| 3,773,702 | 11/1973 | Ohashi | 260/837 |
| 3,773,856 | 11/1973 | Takiyama | 260/837 |
| 3,792,006 | 2/1974 | Najvar | 260/837 |
| 3,793,398 | 2/1974 | Hokamura | 260/837 |
| 3,843,612 | 10/1974 | Vogel | 260/78.5 R |

*Primary Examiner*—Paul Lieberman
*Attorney, Agent, or Firm*—Michael B. Fein

[57] ABSTRACT

A casting resin system which reacts via a vinyl polymerization reaction and cures via an acid-epoxide reaction.

9 Claims, No Drawings

CASTING RESIN SYSTEM CONTAINING ACRYLIC POLYMER IN ACRYLIC MONOMER, DIEPOXIDE, AND POLYETHYLENICALLY UNSATURATED MONOMER

BACKGROUND OF THE INVENTION

This invention relates to resin systems suitable for casting articles and which polymerize via a vinyl reaction and an acid-epoxide reaction, to processes and products employing such resin systems.

Vogel and Hurwitz, Ser. No. 211,645 of Dec. 23, 1971, now U.S. Pat. No. 3,843,612, describe resin systems which polymerize via a vinyl reaction and an acid-epoxide condensation. This invention relates to an improvement to the Vogel-Hurwitz systems.

DESCRIPTION OF THE INVENTION AND PREFERRED EMBODIMENTS

The casting resin system comprises at least one monoethylenically unsaturated monomer, at least one $\alpha,\beta$-monoethylenically unsaturated acid, at least one thermoplastic polymer, at least one diepoxide, and at least one polyethylenically unsaturated monomer. The resin system is cast in the presence of an inorganic particulate filler, a catalyst for the vinyl polymerization reaction, and a catalyst for the acid-epoxide reaction.

The monoethylenically unsaturated monomer is preferably selected from the group consisting of alkyl and cycloalkyl methacrylates such as methyl methacrylate and cyclohexyl methacrylate, styrenes and substituted styrenes such as styrene and vinyl toluene, and mixtures thereof with each other or with additional monomers of this class. Preferably this monomer comprises about 50 to 70 weight percent of the resin system.

The $\alpha,\beta$-monoethylenically unsaturated acid is preferably about 2 to 10 weight percent of the resin system, and is preferably acrylic acid, methacrylic acid, itaconic acid, and the like, and mixtures thereof. Also suitable are a $\alpha$-chloroacrylic acid, mono-methyl itaconiate, 4-pentamoic acid, methacryloxyacetic acid, acryloxypropionic acid and the like.

The thermoplastic polymer can be any which are soluble in the monomer system. Examples include polymers and copolymers of the monomers specified above as monoethylenically unsaturated monomers.

The thermoplastic polymer or mixture thereof is present in the resin system in the amount of 20 to 35 weight percent.

The diepoxide comprises about 1 to 10 percent by weight of the resin system. Any diepoxide at all can be used, for example aliphatic, cycloaliphatic, mixed aliphatic and cycloaliphatic, aromatic, any of which can be substituted with halogen, alkyl, aryl, sulfur radicals, and the like. One diepoxide which is especially preferred, but is by no means the only excellent one, is 3,4-epoxycyclohexylmethyl -3,4 -epoxycyclohexane carboxylate.

The amount of the diepoxide is selected to provide from 0.1 to 1.2 and preferably 0.5 to 0.9 epoxy groups per acid group in the unsaturated acid.

The polyethylenically unsaturated monomer is preferably a di-or tri-methacrylate or acrylate, such as 1,3-butylene glycol dimethacrylate, ethylene dimethacrylate, trimethylol propane trimethacrylate, 1,3-butylene glycol diacrylate, and the like, and mixtures thereof. Divinyl benzene and the like are also suitable. The inclusion of this polyunsaturated monomer in amounts of about 0.1 to 5 parts based on 100 parts of resin system unexpectedly and radically improves the articles cast from the resin system, as shown in the example which follow.

Vinyl polymerization catalyst is preferable present, preferably in amounts of about 0.01 to 1.0 weight parts per 100 of resin, preferably 0.05 to 0.5 weight parts. Suitable ones include the thermal or redox type initiator systems. Examples of thermal initiators include organic peroxides, such as benzoyl peroxide, substituted benzoyl peroxide, acetyl peroxides, lauroyl peroxides, t-butyl hydroperoxide, di-t-butyl hydroperoxide; peresters, such as t-butyl peroxypivalate; azo-type initiators, such as azo-bis-isobutyronitrile; persulfates such as sodium potassim or ammonium persulfates; peroxyphosphates, such as sodium, potassium or ammonium peroxyphosphate. Redox systems may include, for example, a combination of hydroperoxide, such as hydrogen peroxide, t-butyl hydroperoxide, cumene hydroperoxide, diisopropyl benzene hydroperoxide, and the like, with a reducing agent, such as sodium, potassium, or ammonium bisulfite, metabisulfite or hydrosulfite, sulful dioxide, hydrazine, ferrous salts, isoascorbic acid, sodium formaldehyde sulfoxalate, and the like. Chain transfer agents, including mercaptans, polymercaptans, and polyhalogen compounds may be present in the polymerization mixture in the conventional amounts such as from about 0.1 to 2% or more by weight, based on total weight of resin.

A catalyst for the acid-epoxide condensation is preferably organic or inorganic bases, such as amines, including ditertiary amines, such as dimethylaminophenol, benzyldimethylamine, and dimethylaminoethyl phenol, alkali metal or alkali earth metal hydroxides such as sodium hydroxide, and calcium hydroxide, quaternary ammonium hydroxides such as benzyltrimethyl ammonium hydroxide; salts, which in the presence of epoxy groups generate basic substances such as potassium acetate, sodium methacrylate, quaternary ammonium salts, such as benzyltrimethyl ammonium acetate, nitrate, or chloride, sodium dodecylbenzene sulphonate and alkyl, aryl, or alkylaryl phosphonium iodides such as tetraethyl phosphonium iodide. The acid-epoxides catalysts are employed in catalytic quantities, usually about 0.01 percent to 5 percent based on resin.

During the storage of the casting resin system some autogeneous reaction between the diepoxide and the acid monomer and/or with acid groups in the copolymer occurs unless the casting resin is prepared in two parts, one part containing all the monomers but half their respective quantities, all the acids and all the acid-epoxy catalysts, the other part containing the remaining quantities of monomers and all the epoxys without any acid. The two parts can then be mixed prior to using them. The two parts when mixed and properly filled with mineral fillers and initiated can be cast and caused to polymerize and then cured by heating to elevated temperatures of about 120°C. to 200°C., preferably 150°C. for a time of at least 15 seconds up to 20 hours, in the form determined by the construction or shape of the device in which the casting is performed. The proportion of diepoxide relative to the number of acid groups available in the polymerizing composition preferably is so selected that curing in the elevated temperature range just specified results in substantially complete reaction of the epoxy groups to form an insoluble, essentially fully cured polymeric product containing no or an insignificant amount of oxirane oxygen.

The following examples are included as representative of the embodiments of the present invention. The parts and percentages are by weight and the temperatures are in centigrade unless otherwise noted.

EXAMPLE I

A two component casting resin system is prepared by mixing 65 parts methyl methacrylate, 0.5 parts of sodium carbonate as an acid-epoxy reaction catalyst, 6.5 parts methacrylic acid, 28 parts of a copolymer of methyl methacrylate and ethyl acrylate (MM/EA) with a weight ratio of 99:1 and molecular weight of 100,000, 0.015 parts of methyl ether hydroquinone as an inhibitor, 0.520 parts of N-dodecylmercaptan as a chain transfer agent, and 1.28 parts of trioctyl phosphite as a heat stabilizer. All of the components are heated at 50°C. to effect complete solution. A second solution is prepared by mixing at 50°C. 64.5 parts of methyl methacrylate monomer, 26.0 parts of a copolymer of methyl methacrylate and ethyl acrylate (MM/EA) at a weight ratio of 99:1 and molecular weight of 100,000, 9.56 parts of 3,4-epoxycyclohexylcarbinyl-3,4-epoxycyclohexanecarboxylate, 1.0 parts of 1.3-butylene glycol dimethacrylate, and 0.01 parts of methyl ether of hydroquinone as an inhibitor. The Brookfield viscosites of each of these two resins is approximately 200 cps. at 25°C., using a No. 2 spindle at 6 RPM on the Brookfield viscometer.

EXAMPLE II

The two resins prepared in Example I are mixed at a ratio of 1:1 with 0.5 percent t-butyl peroxypivalate as free radical initiator. One part of the resulting catalyzed resin is mixed with 2-½ parts of finely ground alumina trihydrate having an average particle size of 6.8-8.5 microns and the viscosity of the resulting mixture is about 20,000 cps. at 25°C. measured with a No. 2 spindle at 6 RPM on the Brookfield viscometer. The resulting casting mixture is introduced into a two part cavity mold in the shape of a bathroom vanity top. The mold is put in an oven at 90°C. for 1 hour to effect vinyl polymerization. The resulting casting is removed from the mold and cured in an oven at a temperature of 150°C. for 6 hours to effect acid/epoxide crosslinking reaction.

EXAMPLE III

Example I is repeated except that in the second solution the 1,3-butylene glycol dimethacrylate is omitted and the two solutions are mixed, filler added, and the resultant casting mixture introduced into a mold, polymerized, and cured under the same conditions as in Example II. The viscosities before mixing and after mixing are the same as in Example I and II. The resultant cast vanity is removed from the mold.

EXAMPLE IV

The castings prepared in Example II and III are subjected to the following test designed to evaluate plumbing fixtures, namely "Federal Specifications, Plumbing fixtures (lavatories, land use) No. WW-P-541/4A" which consists of a hot (170°F.)-cold(70°F.) water cycle test simulating extended use of bathroom vanity tops and other sanitaryware. The test comprised continuous recycling of hot (170°F.) and cold (70°F.) water for 500 cycles or until failure occurs. Failure consisted of cracking or otherwise detracting from the appearance of the bowl of the vanity. The vanity prepared in accordance with Example III failed in less than 100 cycles whereas the vanity prepared in accordance with Example II lasted 1,400 cycles.

EXAMPLE V

Examples I and II are repeated except that sand (foundry sand of 150 mesh) is used at 60 % levels. The vanity is cast and cured as described above and tested as in Example IV. The vanity of this example lasted 5,000 cycles without any failure.

I claim:

1. In a casting resin system comprising about 50 to 70 parts by weight of monoethylenically unsaturated monomer selected from the group consisting of alkyl and cycloalkyl methacrylates, styrene, substituted styrene, and mixtures thereof, about 2 to 10 parts by weight of an $\alpha,\beta$-monoethylenically unsaturated carboxylic acid, about 20 to 35 parts by weight of a thermoplastic addition polymer of at least one monomer selected from the group consisting of alkyl and cycloalkyl methacrylates, styrene, substituted styrene, and mixtures thereof, and about 1 to 10 parts by weight of a diepoxide, the improvement comprising further including about 0.1 to 5 parts by weight per 100 parts resin system of a polyethylenically unsaturated monomer.

2. The resin system of claim 1 wherein the polyethylenically unsaturated monomer is 1.3-butylene glycol dimethacrylate.

3. The resin system of claim 1 wherein said polyethylenically unsaturated monomer is a dimethyacrylate or a diacrylate.

4. The resin system of claim 1 wherein the monoethylenically unsaturated monomer is comprised of methyl methacrylate, the thermoplastic polymer is comprised of a polymer or copolymer of methyl methacrylate, and the polyethylenically unsaturated monomer is 1,3-butylene glycol dimethacrylate.

5. The casting resin system of claim 1 further including 20 to 500 parts of an inorganic particulate filler.

6. A process of preparing a cast article comprising first heating in a mold the composition of claim 1 at about 20 to 100°C. causing essentially the vinyl polymerization reaction, then heating the resultant article at about 140° to 200°C. to cause essentially the acid-epoxide reaction.

7. The cast article prepared by the process in claim 6.

8. The article of claim 7 in the form of a bathroom vanity top.

9. 100 parts by weight of a two part casting resin system comprising a major amount of monoethylenically unsaturated monomer selected from the group consisting of alkyl and cycloalkyl methacrylates, styrene, substituted styrene, and mixtures thereof, an $\alpha,\beta$-monoethylenically unsaturated carboxylic acid, a minor amount of a thermoplastic addition polymer of at least one monomer selected from the group consisting of alkyl and cycloalkyl methacrylates, styrene, substituted styrene, and mixtures thereof, about 1 to 10 parts by weight of and about 0.1 to 5 parts by weight per 100 parts resin system of a polyethylenically unsaturated monomer, the proportion of diepoxide to acid selected so as to result in substantially complete reaction of the epoxy group upon curing, wherein all of the $\alpha,\beta$-monoethylenically unsaturated acid is contained in one part and all of the diepoxide is contained in the other part.

* * * * *